United States Patent
Devasigamani

(10) Patent No.: US 12,291,345 B2
(45) Date of Patent: May 6, 2025

(54) DEVICE FOR COOLING AN AIRCRAFT PROPULSION SYSTEM, COMPRISING AT LEAST ONE PAIR OF INTAKE AND EXHAUST FLAPS AND AN ACTUATOR CONTROLLING SAID FLAPS

(71) Applicant: Airbus Operations SAS, Toulouse (FR)

(72) Inventor: Nandakumar Devasigamani, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 333 days.

(21) Appl. No.: 17/891,226

(22) Filed: Aug. 19, 2022

(65) Prior Publication Data

US 2023/0055732 A1  Feb. 23, 2023

(30) Foreign Application Priority Data

Aug. 23, 2021  (FR) ....................................... 2108817

(51) Int. Cl.
*B64D 33/08* (2006.01)
*B64D 27/24* (2006.01)
*H02K 9/04* (2006.01)

(52) U.S. Cl.
CPC ............. *B64D 33/08* (2013.01); *B64D 27/24* (2013.01); *H02K 9/04* (2013.01)

(58) Field of Classification Search
CPC ......... B64D 33/08; B64D 27/14; F02K 3/062; F02C 6/00; F02C 6/02
See application file for complete search history.

(56) References Cited

U.S. PATENT DOCUMENTS

| | | | | |
|---|---|---|---|---|
| 1,427,872 | A * | 9/1922 | Verville | B64D 33/10 244/57 |
| 2,087,832 | A * | 7/1937 | Birkigt | B64D 33/10 244/57 |
| 2,434,085 | A * | 1/1948 | Suggs | B64D 33/10 244/57 |
| 2,462,201 | A * | 2/1949 | Kilgore | B64D 27/24 318/773 |
| 11,199,132 | B2 * | 12/2021 | Diaz | F02C 7/18 |
| 2019/0084688 | A1 * | 3/2019 | Parsons | F02C 7/04 |
| 2020/0025072 | A1 | 1/2020 | Mackin et al. | |
| 2021/0036580 | A1 | 2/2021 | Cottrell | |

FOREIGN PATENT DOCUMENTS

EP  3597540 A1  1/2020

OTHER PUBLICATIONS

French Search Report; priority document.

\* cited by examiner

*Primary Examiner* — Thuyhang N Nguyen
(74) *Attorney, Agent, or Firm* — Greer, Burns & Crain, Ltd.

(57) ABSTRACT

A device for cooling an aircraft propulsion system, including at least one cooling circuit with at least one air inlet equipped with an intake flap mobile between closed and open positions and at least one air outlet equipped with an exhaust flap mobile between closed and open positions, and at least one actuator coupled by at least one kinematic system to the pair of intake and exhaust flaps in such a manner that the intake and exhaust flaps are driven in synchronized movements and simultaneously occupy the closed position or the open position. This solution enables reduction of the number of actuators and, finally, the all-up weight of the aircraft.

11 Claims, 4 Drawing Sheets

DEVICE FOR COOLING AN AIRCRAFT PROPULSION SYSTEM, COMPRISING AT LEAST ONE PAIR OF INTAKE AND EXHAUST FLAPS AND AN ACTUATOR CONTROLLING SAID FLAPS

CROSS-REFERENCES TO RELATED APPLICATIONS

This application claims the benefit of the French patent application No. 2108817 filed on Aug. 23, 2021, the entire disclosures of which are incorporated herein by way of reference.

FIELD OF THE INVENTION

The present invention relates to a device for cooling an aircraft propulsion system, comprising at least one pair of intake and cooling flaps and an actuator controlling the flaps. The present application relates also to an aircraft propulsion system comprising the cooling device.

BACKGROUND OF THE INVENTION

In an embodiment that can be seen in FIG. 1, an aircraft comprises a fuselage 10, wings 12 extending on either side of the fuselage 10 and electric propulsion systems 14 connected to the wings 12.

In an embodiment that can be seen in FIG. 2, each electric propulsion system 14 comprises at least one electrical power supply system, such as a set of fuel cells for example, an electric motor powered by the electrical power supply system, a propulsion propellor 16 driven in rotation by the electric motor and a nacelle 18 housing the electrical power supply system and the electric motor.

When operating the electrical power supply system gives off heat that has to be evacuated. To this end the electric propulsion system 14 comprises a cooling device 20 comprising four cooling circuits 20.1 to 20.4. In one arrangement the cooling device 20 comprises two lateral cooling circuits 20.1 and 20.2 disposed in a symmetrical manner relative to a vertical median plane of the electric propulsion system 14 and two lower cooling circuits 20.3, 20.4.

In an embodiment that can be seen in FIG. 3, each lateral cooling circuit 20.1, 20.2 comprises, in the direction of flow of air, an air inlet 22.1, 22.2, an intake duct 24.1, 24.2, a heat exchanger 26.1, 26.2, an exhaust duct 28.1, 28.2, a fan 30.1, 30.2 and an air outlet 32.1, 32.2.

The two lower cooling circuits 20.3, 20.4 comprise a common air inlet 22.3, after which each includes an intake duct 24.3, 24.4, a heat exchanger 26.3, 26.4, an exhaust duct 28.3, 28.4, a fan 30.3, 30.4 and an air outlet 32.3, 32.4.

This cooling device does not always function with the same cooling capacity. Thus, the lateral cooling circuits 20.1, 20.2 function intermittently, in particular when the aircraft is on the ground. To limit aerodynamic perturbations, each air inlet or outlet 22.1 to 22.3, 32.1 to 32.4 comprises a flap 34 configured to occupy an open position in which it allows air to pass and a closed position in which it prevents air from passing and is positioned in line with the wall of the nacelle 18. The cooling device 20 comprises, for each flap 34, an actuator 36 configured to move the flap 34 from the open position toward the closed position and vice-versa, and a controller 38 common to all the flaps 34 configured to control the actuators 36 and to monitor the open or closed position of each flap 34. This controller 38 enables synchronization of the movements of the flaps 34 positioned at the level of the air inlet and outlet of each cooling circuit.

In the embodiment illustrated in FIG. 3, each electric propulsion system 14 comprises seven flaps 34 and therefore seven actuators 36.

This number of actuators 36 leads to an increase in the all-up weight of the aircraft and impacts its energy consumption.

The present invention aims to remedy some or all of the disadvantages of the prior art.

SUMMARY OF THE INVENTION

To this end, the invention has for an object a device for cooling an aircraft propulsion system, comprising:
- at least one cooling circuit that has at least one air inlet and at least one air outlet,
- at least one intake flap mobile between an open position in which the intake flap uncovers at least partially the air inlet and a closed position in which the intake flap blocks the air inlet,
- at least one exhaust flap mobile between an open position in which the exhaust flap uncovers at least partially the air outlet and a closed position in which the exhaust flap blocks the air outlet.

In accordance with the invention, the cooling device comprises at least one actuator coupled by at least one kinematic system to the pair of intake flaps and exhaust flaps in such a manner that the intake and exhaust flaps are driven in synchronized movements and simultaneously occupy the closed position or the open position.

The fact of coupling the intake and exhaust flaps of the air inlet and outlet of the same cooling circuit to the same actuator enables reduction of the number of actuators and the all-up weight of the aircraft.

In accordance with another feature, the cooling device comprises a sliding connection configured to connect the intake flap to a structure of the propulsion system and to enable the intake flap to move in translation in a translation direction.

In accordance with another feature, the cooling device comprises a pivoting connection configured to connect the exhaust flap to a structure of the propulsion system and to enable the exhaust flap to pivot about a pivot axis.

In accordance with another feature, the translation direction and the pivot axis are perpendicular.

In accordance with another feature, the cooling device comprises a plurality of cooling circuits, each having at least one air inlet and at least one air outlet and at least one exhaust flap configured to block simultaneously, in the closed position, two air outlets of two cooling circuits.

In accordance with another feature, the cooling device comprising a plurality of cooling circuits, each having at least one air inlet and at least one air outlet, a plurality of pairs of intake and exhaust flaps and an actuator coupled to a plurality of pairs of intake and exhaust flaps.

In accordance with a first embodiment, the cooling device comprises main cooling circuits including a single main air inlet equipped with a main intake flap and a single main air outlet equipped with a main exhaust flap, and two, right-hand and left-hand, secondary cooling circuits, each including a right-hand or left-hand secondary air inlet equipped with a right-hand or left-hand secondary intake flap and a right-hand or left-hand secondary air outlet equipped with a right-hand or left-hand secondary exhaust flap, and the cooling device comprises a first actuator coupled to the pair of main intake and exhaust flaps and controlling the movements thereof, a second actuator coupled to the pair of right-hand secondary intake and exhaust flaps and controlling the movements thereof, and a third actuator coupled to the pair of left-hand secondary intake and exhaust flaps and controlling the movements thereof.

In accordance with a second embodiment, the cooling device comprises main cooling circuits including a single main air inlet equipped with a main intake flap and a single main air outlet equipped with a main exhaust flap and two, right-hand and left-hand, secondary cooling circuits, each including a right-hand or left-hand secondary air inlet equipped with a right-hand or left-hand secondary intake flap and a right-hand or left-hand secondary air outlet equipped with a right-hand or left-hand secondary exhaust flap. Additionally, the cooling device comprises a first actuator coupled to the main intake flap and controlling the movements thereof, a second actuator coupled to the main exhaust flap and controlling the movements thereof, a third actuator coupled to the pair of right-hand secondary intake and exhaust flaps and controlling the movements thereof, and a fourth actuator coupled to the pair of left-hand secondary intake and exhaust flaps and controlling the movements thereof.

In accordance with a third embodiment, the cooling device comprises main cooling circuits including a single main air inlet equipped with a main intake flap and a single main air outlet equipped with a main exhaust flap and two, right-hand and left-hand, secondary cooling circuits, each including a right-hand or left-hand secondary air inlet equipped with a right-hand or left-hand secondary intake flap and a right-hand or left-hand secondary air outlet, a single secondary exhaust flap being provided to block simultaneously in the closed position the right-hand and left-hand secondary air outlets. Additionally, the cooling device comprises a first actuator coupled to the pair of main intake and exhaust flaps and controlling the movements thereof, a second actuator coupled to the right-hand secondary intake flap and controlling the movements thereof, a third actuator coupled to the left-hand secondary intake flap and controlling the movements thereof, and a fourth actuator coupled to the secondary exhaust flap and controlling the movements thereof.

In accordance with a fourth embodiment, the cooling device comprises main cooling circuits including a single main air inlet equipped with a main intake flap and a single main air outlet equipped with a main exhaust flap and two, right-hand and left-hand, secondary cooling flaps, each including a right-hand or left-hand secondary air inlet equipped with a right-hand or left-hand secondary intake flap and a right-hand or left-hand secondary air outlet, a single secondary exhaust flap being provided to block simultaneously in the closed position the right-hand and left-hand secondary air outlets. Additionally, the cooling device comprises a first actuator coupled to the pair of main intake and exhaust flaps and controlling the movements thereof and a second actuator coupled to the right-hand and left-hand secondary intake flaps as to the secondary exhaust flap and controlling the movements thereof.

In accordance with another feature, the cooling device comprises a controller configured to control the actuators and to monitor the movements of the various intake and exhaust flaps.

The invention also has for object an aircraft propulsion system comprising at least one cooling device having any of the foregoing features.

Finally, the invention also has for an object an aircraft comprising propulsion systems each including at least one cooling device having any of the foregoing features.

BRIEF DESCRIPTION OF THE DRAWINGS

Other features and advantages will emerge from the following description of the invention given by way of example only with reference to the appended drawings, in which.

DETAILED DESCRIPTION OF THE PREFERRED EMBODIMENTS

Figure 6:
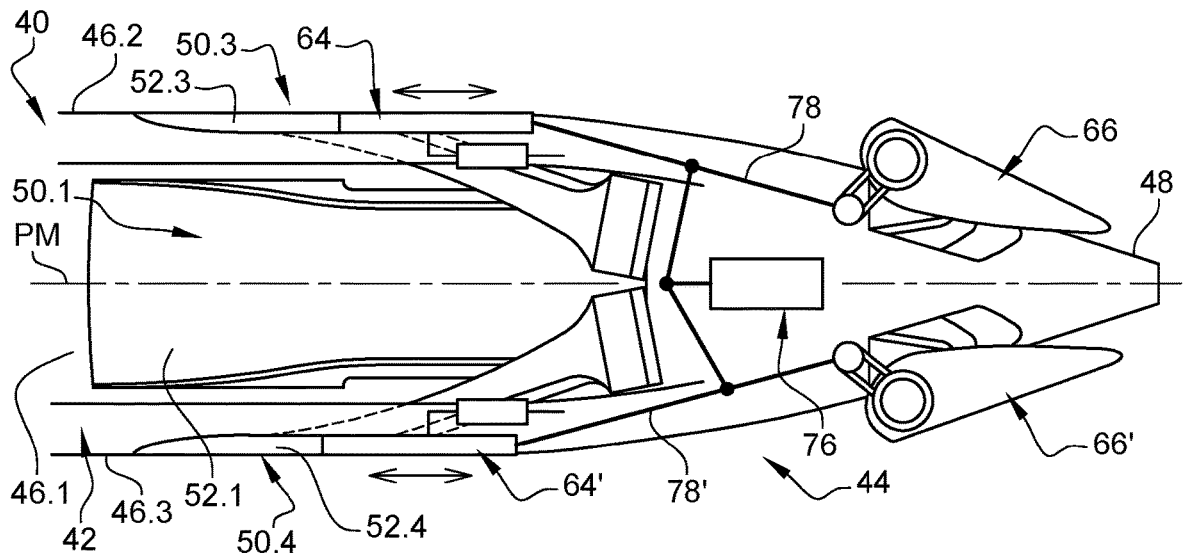
FIG. 6 is a schematic representation of a part of an aircraft propulsion system illustrating one embodiment of the invention.

As illustrated in FIG. 6, a propulsion system 40 of an aircraft has a vertical median plane PM. This propulsion system 40 may be of electric type and comprise a set of fuel cells. It comprises a fairing 42 and at least one cooling device 44 embodiments of which are represented in FIGS. 10 to 13.

In one configuration the fairing 42 comprises a central part that has a lower face 46.1 and two, right-hand and left-hand, lateral faces 46.2, 46.3 and an approximately conical rear tip 48 that extends the central part.

This cooling device 44 comprises two main cooling circuits 50.1, 50.2 positioned in the lower part of the propulsion system 40 (at approximately 6 o'clock) in a symmetrical manner relative to the vertical median plane PM and two secondary cooling circuits 50.3, 50.4 positioned near the lateral faces 46.2, 46.3 (at approximately 3 o'clock and 9 o'clock) in a symmetrical manner to the vertical median plane PM.

Each main or secondary cooling circuit 50.1 to 50.4 is configured to channel air and comprises, in the direction of the flow of air, at least one air inlet 52.1, 52.3 and 52.4 configured to take in air from outside the fairing 42, at least one intake duct 54.1 to 54.4, at least one heat exchanger 56.1 to 56.4, at least one exhaust duct 58.1 to 58.4, and at least one air outlet 60.1, 60.3 and 60.4 configured to discharge air to the exterior of the fairing 42. In one configuration, at least one of the cooling circuits 50.1 to 50.4 comprises a fan 62 positioned in the exhaust duct 58.1 to 58.4.

In one arrangement, the main cooling circuits 50.1, 50.2 comprise a single main air inlet 52.1 common to the two main cooling circuits 50.1, 50.2 which feeds a first common intake section that is divided into two intake ducts 54.1, 54.2. This main air inlet 52.1 opens at the level of the lower face 46.1 of the fairing 42, at approximately 6 o'clock. It is symmetrical relative to the vertical median plane PM. In one embodiment, the main air inlet 52.1 of the main cooling circuits 50.1, 50.2 is of the flush type.

Of course, the invention is not limited to this arrangement. The air inlets of the main cooling circuits 50.1, 50.2 could be separate.

In one arrangement, the main cooling circuits 50.1, 50.2 comprise a single main air outlet 60.1 common to the two main cooling circuits 50.1, 50.2 fed by the two exhaust ducts 58.1, 58.2. This main air outlet 60.1 opens in the lower part of the rear tip 48 of the fairing 42 at approximately 6 o'clock. It is symmetrical relative to the vertical median plane PM.

Of course, the invention is not limited to this arrangement. The air outlets of the main cooling circuits 50.1, 50.2 could be separate and respectively positioned in the right-hand lower quarter and the left-hand lower quarter of the rear tip 48 of the fairing 42.

In one arrangement, the secondary air inlets 52.3 and 52.4 of the secondary cooling circuits 50.3, 50.4 are respectively positioned on the right-hand and left-hand lateral faces 46.2, 46.3 of the fairing 42. The secondary air outlets 60.3, 60.4 of the secondary cooling circuits 50.3, 50.4 are separate and respectively positioned in the upper right-hand quarter and the upper left-hand quarter of the rear tip 48 of the fairing 42.

Of course, the invention is not limited to this arrangement. Thus, the secondary cooling circuits 50.3 and 50.4 could have a single air outlet.

To limit aerodynamic perturbations, at least one air inlet 52.1, 52.3, 52.4 comprises an intake flap 64 mobile between an open position in which the intake flap 64 at least partially uncovers the air inlet 52.1, 52.3, 52.4 and enables air to penetrate into the intake ducts 54.1 to 54.4, and a closed position in which the intake flap 64 blocks the air inlet 52.1, 52.3, 52.4 and prevents air from penetrating into the intake ducts 54.1 to 54.4. In one configuration the intake flap 64 is configured to be flush with the fairing 42 in the closed position.

In one configuration, each air inlet 52.1, 52.3, 52.4 is equipped with an intake flap 64 mobile between open and closed positions.

Additionally, at least one air outlet 60.1, 60.3, 60.4 comprises an exhaust flap 66 mobile between an open position in which the exhaust flap 66 uncovers, at least partially, the air outlet 60.1, 60.3, 60.4 and enables air to exit the exhaust duct 58.1 to 58.4 and a closed position which the exhaust flap 66 blocks the air outlet 60.1, 60.3, 60.4 and prevents air from exiting the exhaust duct 58.1 to 58.4. In one configuration, the exhaust flap 66 is configured to be flush with the fairing 42 in the closed position.

By open position is meant a completely open or partially open position and in all cases a position different from the closed position.

Figure 7:
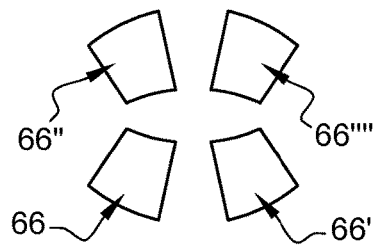
FIG. 7 is a schematic representation of the exhaust flaps of a cooling device of an aircraft propulsion system illustrating a first configuration of the invention.

In a configuration that can be seen in FIG. 7, the cooling device 44 comprises four air outlets, one for each cooling circuit 50.1, 50.4, and four exhaust flaps 66, 66', 66", 66''', one for each air outlet.

Figure 8:
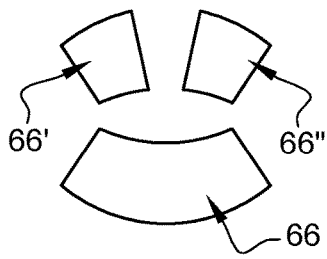
FIG. 8 is a schematic representation of the exhaust flaps of a cooling device of an aircraft propulsion system illustrating a second configuration of the invention.

In another configuration that can be seen in FIG. 8 the cooling device 44 comprises a single main air outlet 60.1 for the two main cooling circuits 50.1, 50.2, a main exhaust flap 66 for this main air outlet 60.1, two secondary air outlets 60.3, 60.4, one for each secondary cooling circuit 50.3, 50.4, and two secondary exhaust flaps 66', 66", one for each secondary air outlet 60.3, 60.4. In this embodiment the cooling device 44 comprises three exhaust flaps 66, 66', 66".

In another configuration, the device comprises two main air outlets, two secondary air outlets, a main exhaust flap 66 configured to block simultaneously the two main air outlets in the closed position, and two secondary exhaust flaps 66', 66", one for each secondary air outlet. In this embodiment, the cooling device 44 comprises three exhaust flaps 66, 66', 66".

Figure 9:
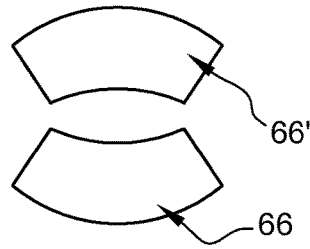
FIG. 9 is a schematic representation of the exhaust flaps of a cooling device of an aircraft propulsion system illustrating a third configuration of the invention.

In another configuration that can be seen in FIG. 9, the cooling device 44 comprises a single main air outlet for the two main cooling circuits 50.1, 50.2, a main exhaust flap 66 for that main air outlet, a single secondary air outlet for the two secondary cooling circuits 50.3, 50.4, and a secondary exhaust flap 66' for that secondary air outlet. In this embodiment, the cooling device 44 comprises two exhaust flaps 66, 66'.

In another configuration, the device comprises two main air outlets, two secondary air outlets, a main exhaust flap 66 configured to block simultaneously the two main air outlets in the closed position, and a secondary exhaust flap 66' configured to block simultaneously the two secondary air outlets in the closed position. In this embodiment the cooling device 44 comprises two exhaust flaps 66, 66'.

Thus, an exhaust flap 66, 66' may be configured to block simultaneously in the closed position two air outlets of two cooling circuits.

Regardless of the embodiment, the cooling device 44 comprises:
- at least one cooling circuit 50.1 to 50.4 that has at least one air inlet 52.1, 52.3, 52.4 and at least one air outlet 60.1, 60.3, 60.4,
- at least one intake flap 64 configured to block in the closed position at least the air inlet of the cooling circuit,
- at least one exhaust flap 66 configured to block in the closed position at least the air outlet of the cooling circuit.

Figure 1:
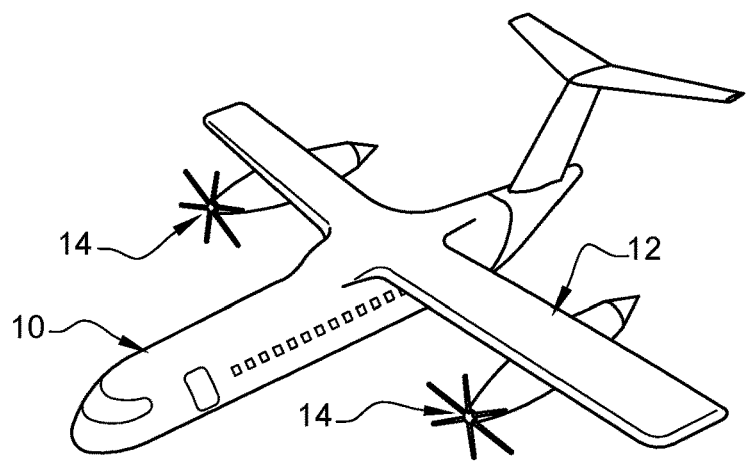
FIG. 1 is a perspective view of an aircraft.
Figure 2:
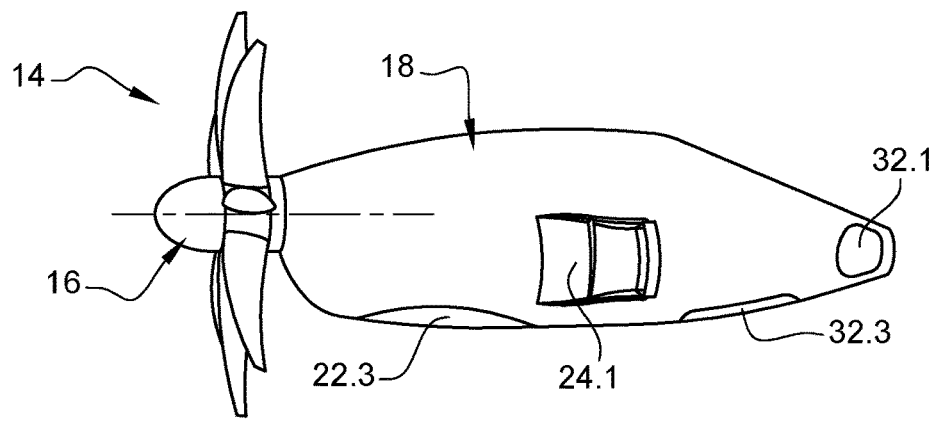
FIG. 2 is a lateral view of an aircraft electric propulsion system illustrating one embodiment.
Figure 3:
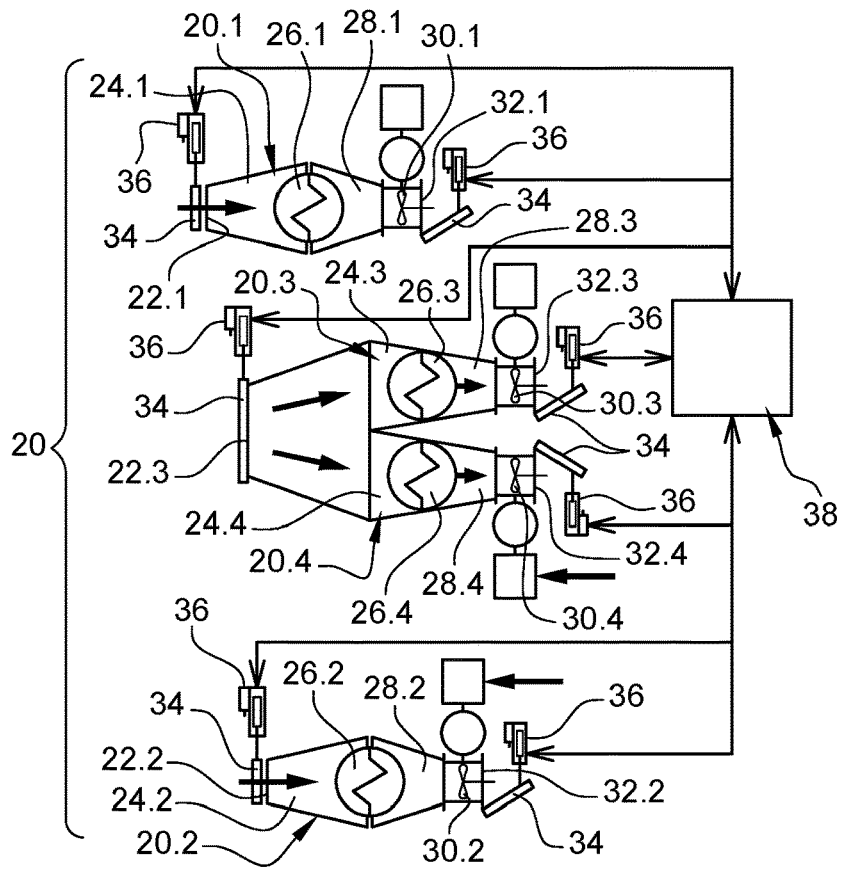
FIG. 3 is a schematic representation of a cooling device of an aircraft electric propulsion system illustrating a prior art embodiment.
Figure 4:
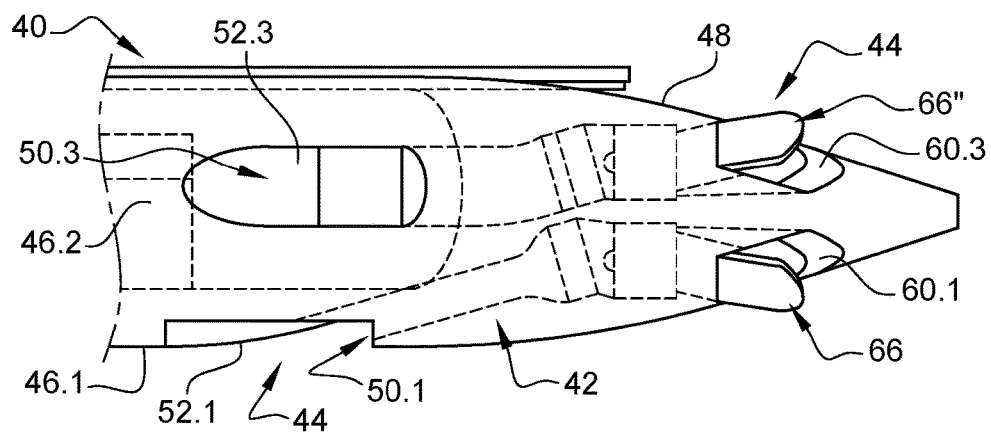
FIG. 4 is a lateral view of a part of an aircraft propulsion system illustrating one embodiment of the invention.
Figure 5:
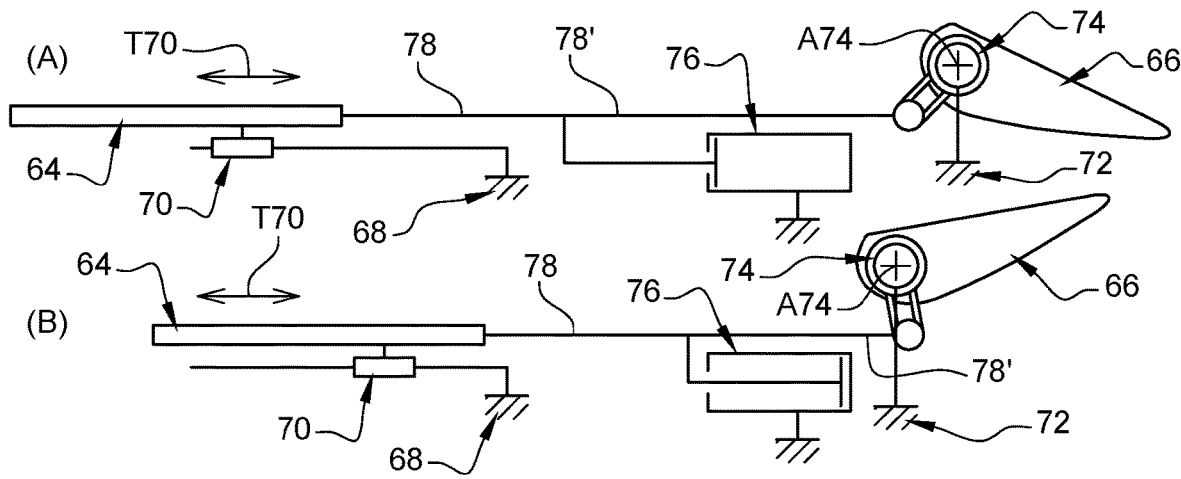
FIG. 5 is a schematic representation of a pair of intake and exhaust flaps, in the upper part in the closed position and in the lower part in the open position, illustrating one embodiment of the invention.

The intake and exhaust flaps 64, 66 of the same cooling circuit have synchronized movements and simultaneously occupy the closed position, as illustrated in part A of FIG. 5, or an open position, as illustrated in part B of FIG. 5.

In an embodiment that can be seen in FIG. 5, the intake flap 64 is connected to a structure 68 of the propulsion system 40 by a sliding connection 70. Thus, the intake flap 64 is driven in a movement in translation in a translation direction T70 to go from the closed position to an open position or vice-versa.

In an embodiment that can be seen in FIG. 5, the exhaust flap 66 is connected to a structure 72 of the propulsion system 40 by a pivoting connection 74. Thus, the exhaust flap 66 is driven in a movement of pivoting about a pivot axis A74 to go from the closed position to an open position or vice-versa.

In one configuration, the structures 68, 72 may form one and the same structure.

In one arrangement, the translation direction T70 and the pivot axis A74 are perpendicular.

In one embodiment, the device 44 comprises at least one actuator 76, a first kinematic system 78 connecting the actuator 76 and the intake flap 64, and a second kinematic system 78' connecting the actuator 76 and the exhaust flap 66, the first and second kinematic systems 78, 78' being configured so that the movements of the intake and exhaust flaps 64, 66 are synchronized so that the intake and exhaust flaps 64, 66 simultaneously occupy the closed position, as illustrated in part A of FIG. 5, or an open position, as illustrated in part B of FIG. 5.

The first and second kinematic systems 78, 78' may be separate, form one and only one kinematic system, or have parts in common.

In one configuration, the actuator 76 may be a pneumatic, hydraulic or electric cylinder or any other linear or rotary mechanical actuator.

In one embodiment, each kinematic system 78', 78 comprises at least one link converting the linear or rotary movement of the actuator 76 into a movement in translation of the intake flap 64 and a movement in rotation of the exhaust flap 66.

In an embodiment that can be seen in FIG. 5, an actuator 76 is coupled by at least one kinematic system 78, 78' to a single pair of intake and exhaust flaps 64, 66.

In an embodiment that can be seen in FIG. 6, an actuator 76 is coupled by at least one kinematic system 78, 78' to pairs of intake and exhaust flaps 64, 66, 64', 66'.

The cooling device 44 comprises a controller 80 configured to control the various actuators 76 and to monitor the movements of the various intake and exhaust flaps 64, 66.

Figure 10:
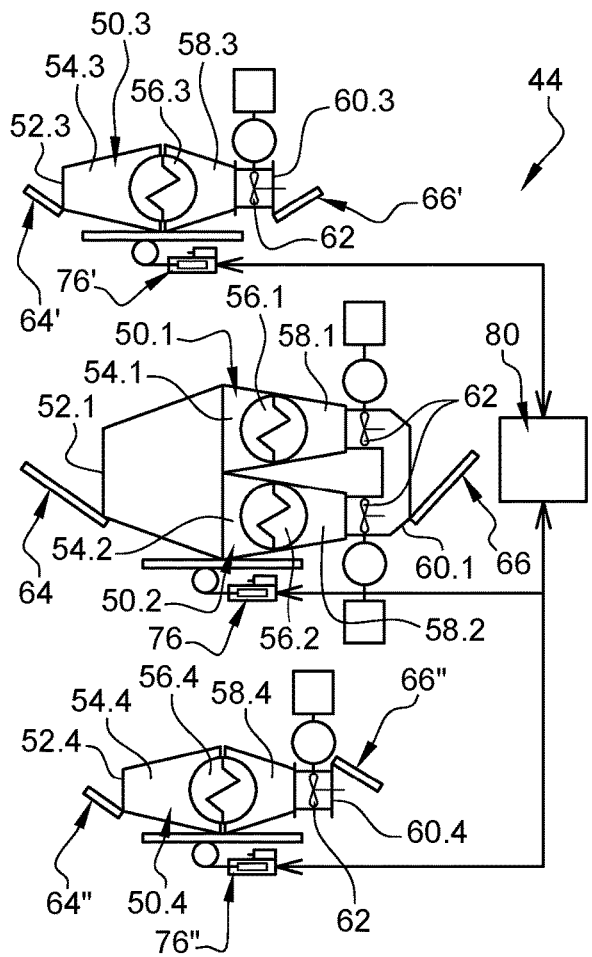
FIG. 10 is a schematic representation of a cooling device of an aircraft propulsion system illustrating a first embodiment of the invention.

In an embodiment that can be seen in FIG. 10, the main cooling circuits 50.1, 50.2 comprise a single main air inlet 52.1 equipped with a main intake flap 64 and a single main air outlet 60.1 equipped with a main exhaust flap 66. Each secondary cooling circuit 50.3, 50.4 comprises a right-hand or left-hand secondary air inlet 52.3, 52.4 equipped with a right-hand or left-hand secondary intake flap 64', 64" and a right-hand or left-hand secondary air outlet 60.3, 60.4 equipped with a right-hand or left-hand secondary exhaust flap 66', 66".

In this embodiment the cooling device 44 comprises:
a first actuator 76 coupled to the pair of main intake and exhaust flaps 64, 66 and controlling movements thereof,
a second actuator 76' coupled to the pair of right-hand intake and exhaust flaps 64', 66' and controlling the movements thereof,
a third actuator 76" coupled to the pair of left-hand secondary intake and exhaust flaps 64", 66" and controlling the movements thereof.

Figure 11:
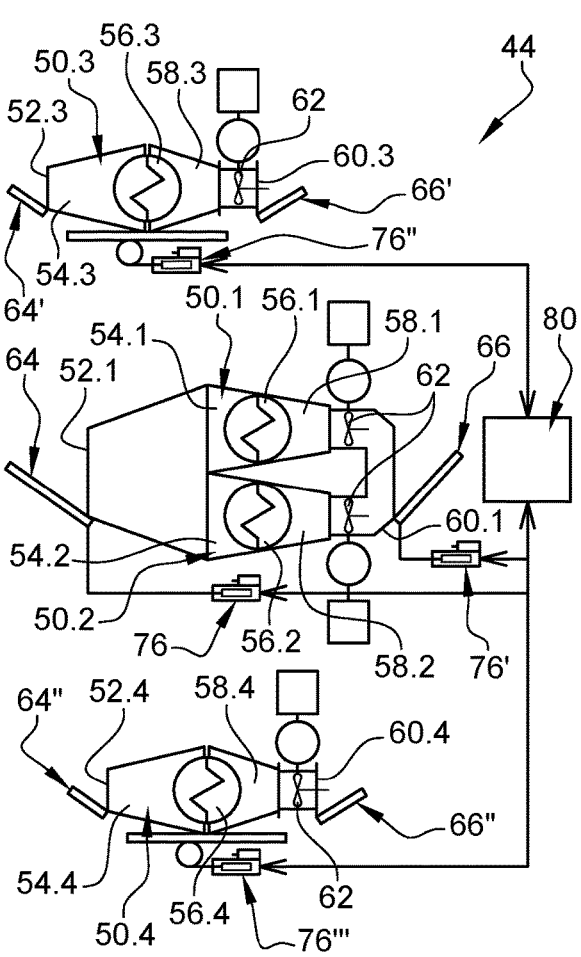
FIG. 11 is a schematic representation of a cooling device of an aircraft propulsion system illustrating a second embodiment of the invention.

In an embodiment that can be seen in FIG. 11, the main cooling circuits 50.1, 50.2 comprise a single main air inlet 52.1 equipped with a main intake flap 64 and a single main air outlet 60.1 equipped with a main exhaust flap 66. Each secondary cooling circuit 50.3, 50.4 comprises a right-hand or left-hand secondary air inlet 52.3, 52.4 equipped with a right-hand or left-hand secondary intake flap 64', 64" and a right-hand or left-hand secondary air outlet 60.3, 60.4 equipped with a right-hand or left-hand secondary exhaust flap 66', 66".

In this embodiment, the cooling device 44 comprises:
a first actuator 76 coupled to the main intake flap 64 and controlling the movements thereof,
a second actuator 76' coupled to the main exhaust flap 66 and controlling the movements thereof,
a third actuator 76" coupled to the pair of right-hand secondary intake and exhaust flaps 64', 66' and controlling the movements thereof,
a fourth actuator 76'" coupled to the pair of left-hand secondary intake and exhaust flaps 64", 66" and controlling the movements thereof.

The controller 80 is configured to control the first and second actuators 76, 76' in order to synchronize the movements of the main intake and exhaust flaps 64, 66.

Figure 12:
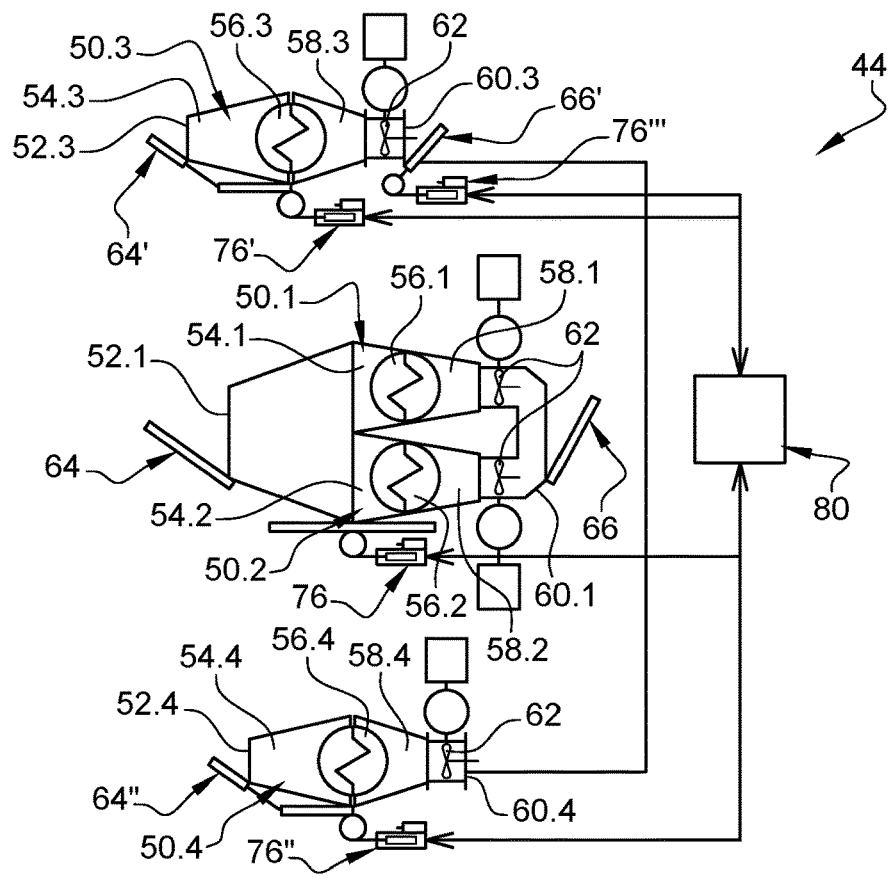
FIG. 12 is a schematic representation of a cooling device of an aircraft propulsion system illustrating a third embodiment of the invention.

In an embodiment that can be seen in FIG. 12, the main cooling circuits 50.1, 50.2 comprise a single main air inlet 52.1 equipped with a main intake flap 64 and a single main air outlet 60.1 equipped with a main exhaust flap 66. Each secondary cooling circuit 50.3, 50.4 comprises a right-hand or left-hand secondary air inlet 52.3, 52.4 equipped with a right-hand or left-hand secondary intake flap 64', 64" and a right-hand or left-hand secondary air outlet 60.3, 60.4. Unlike the embodiments that can be seen in FIGS. 10 and 11, the cooling device 44 comprises a single secondary exhaust flap 66' for opening or closing the right-hand and left-hand secondary air outlets 60.3, 60.4 of the secondary cooling circuits 50.3, 50.4.

In this embodiment, the cooling device 44 comprises:
a first actuator 76 coupled to the pair of main intake and exhaust flaps 64, 66 and controlling the movements thereof,
a second actuator 76' coupled to the right-hand secondary intake flap 64' and controlling the movements thereof,
a third actuator 76" coupled to the left-hand secondary intake flap 64" and controlling the movements thereof,
a fourth actuator 76'" coupled to the secondary exhaust flap 66' and controlling the movements thereof.

The controller 80 is configured to control the second, third and fourth actuators 76', 76", 76'" in order to synchronize the movements of the right-hand and left-hand secondary intake flaps 64', 64" and of the secondary exhaust flap 66'.

Figure 13:
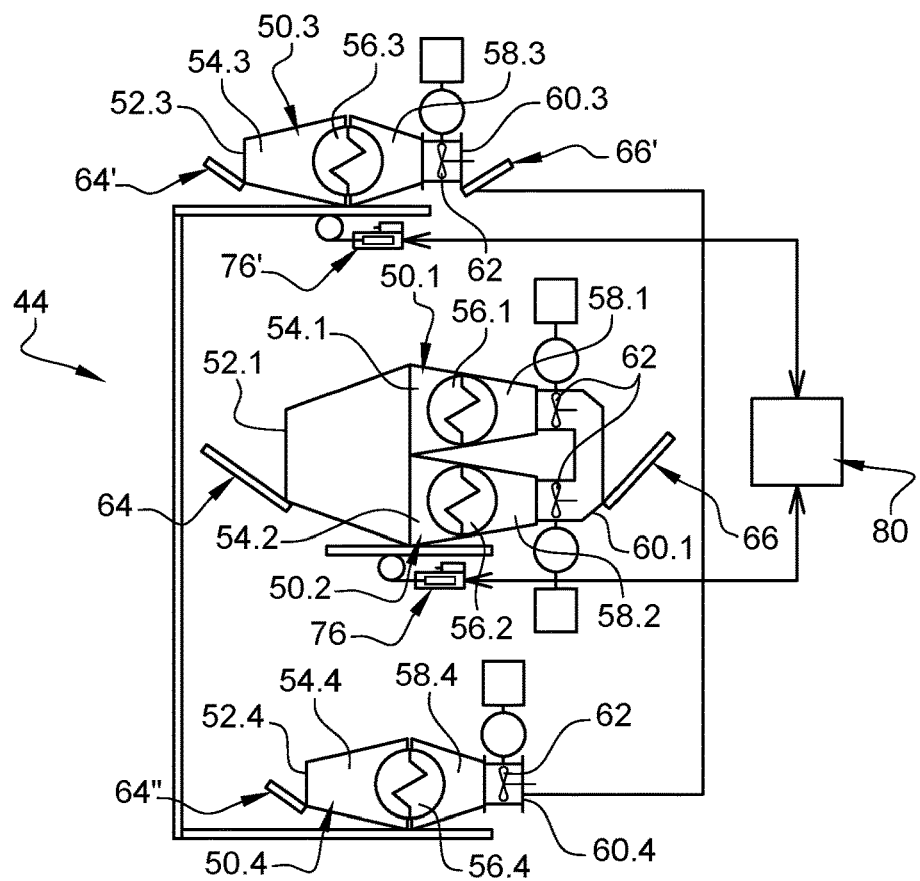
FIG. 13 is a schematic representation of a cooling device of an aircraft propulsion system illustrating a third embodiment of the invention.

In an embodiment that can be seen in FIG. 13, the main cooling circuits 50.1, 50.2 comprise a single main air inlet 52.1 equipped with a main intake flap 64 and a single main air outlet 60.1 equipped with a main exhaust flap 66. Each secondary cooling circuit 50.3, 50.4 comprises a right-hand or left-hand secondary air inlet 52.3, 52.4 equipped with a right-hand or left-hand secondary intake flap 64', 64" and a right-hand or left-hand secondary air outlet 60.3, 60.4. As in the embodiment that can be seen in FIG. 12, the cooling device 44 comprises a single secondary exhaust flap 66' for opening or closing the right-hand and left-hand secondary air outlets 60.3, 60.4 of the secondary cooling circuits 50.3, 50.4.

In this embodiment, the cooling device 44 comprises:
a first actuator 76 coupled to the pair of main intake and exhaust flaps 64, 66 and controlling the movements thereof,
a second actuator 76' coupled to the right-hand and left-hand secondary intake flaps 64', 64" and to the secondary exhaust flap 66' and controlling the movements thereof.

Coupling the intake and exhaust flaps 64, 66 of the air inlet and outlet of the same cooling circuit to the same actuator enables reduction of the number of actuators and the all-up weight of the aircraft. This also enables automatic synchronization of the movements of those intake and exhaust flaps to be obtained.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for cooling an aircraft propulsion system, comprising:
    at least one cooling circuit that has at least one air inlet and at least one air outlet,
    at least one intake flap mobile between an open position in which the intake flap uncovers at least partially the air inlet and a closed position in which the intake flap blocks the air inlet, and
    at least one exhaust flap mobile between an open position in which the exhaust flap uncovers at least partially the air outlet and a closed position in which the exhaust flap blocks the air outlet,
        wherein the cooling device comprises at least one actuator coupled by at least one kinematic system to the pair of intake flaps and exhaust flaps such that said intake and exhaust flaps are driven in synchronized movements and simultaneously occupy the closed position or the open position,
    wherein the cooling device comprises a sliding connection configured to connect the intake flap to a structure of the propulsion system and to enable the intake flap to move in translation in a translation direction,
    wherein the cooling device comprises a pivoting connection configured to connect the exhaust flap to a structure of the propulsion system and to enable the exhaust flap to pivot about a pivot axis, and
    wherein the translation direction and the pivot axis are perpendicular.

2. The cooling device as claimed in claim 1, further comprising:
    a plurality of cooling circuits, each having at least one air inlet and at least one air outlet, and
    at least one exhaust flap configured to block simultaneously, in the closed position, two air outlets of two cooling circuits.

3. The cooling device as claimed in claim 1, further comprising:
    a plurality of cooling circuits, each having at least one air inlet and at least one air outlet, and a plurality of pairs of intake and exhaust flaps,
    an actuator coupled to a plurality of pairs of intake and exhaust flaps.

4. The cooling device as claimed in claim 1,
    wherein the at least one cooling circuit comprises main cooling circuits including a single main air inlet equipped with a main intake flap and a single main air outlet equipped with a main exhaust flap,
    wherein the at least one cooling circuit further comprises two, right-hand and left-hand, secondary cooling circuits, each including a right-hand or left-hand secondary air inlet equipped with a right-hand or left-hand secondary intake flap and a right-hand or left-hand secondary air outlet equipped with a right-hand or left-hand secondary exhaust, and
    wherein the at least one actuator comprises:
    a first actuator coupled to the pair of main intake and exhaust flaps and controlling the movements thereof,
    a second actuator coupled to the pair of right-hand secondary intake and exhaust flaps and controlling the movements thereof, and
    a third actuator coupled to the pair of left-hand secondary intake and exhaust flaps and controlling the movements thereof.

5. The cooling device as claimed in claim 1,
    wherein the at least one cooling circuit comprises main cooling circuits including a single main air inlet equipped with a main intake flap and a single main air outlet equipped with a main exhaust flap,
    wherein the at least one cooling circuit further comprises two, right-hand and left-hand, secondary cooling circuits each including a right-hand or left-hand secondary air inlet equipped with a right-hand or left-hand secondary intake flap and a right-hand or left-hand secondary air outlet equipped with a right-hand or left-hand secondary exhaust flap, and
    wherein the at least one actuator comprises:
    a first actuator coupled to the main intake flap and controlling the movements thereof,
    a second actuator coupled to the main exhaust flap and controlling the movements thereof,
    a third actuator coupled to the pair of right-hand secondary intake and exhaust flaps and controlling the movements thereof, and
    a fourth actuator coupled to the pair of left-hand secondary intake and exhaust flaps and controlling the movements thereof.

6. The cooling device as claimed in claim 1,
    wherein the at least one cooling circuit comprises main cooling circuits including a single main air inlet equipped with a main intake flap and a single main air outlet equipped with a main exhaust flap,
    wherein the at least one cooling circuit further comprises two, right-hand and left-hand, secondary cooling circuits, each including a right-hand or left-hand secondary air inlet equipped with a right-hand or left-hand secondary intake flap and a right-hand or left-hand secondary air outlet,
    wherein the cooling device further comprises;
    a single secondary exhaust flap configured to block simultaneously in the closed position the right-hand and left-hand secondary air outlets,
    and wherein the at least on actuator comprises:
    a first actuator coupled to the pair of main intake and exhaust flaps and controlling the movements thereof,
    a second actuator coupled to the right-hand secondary intake flap and controlling the movements thereof,
    a third actuator coupled to the left-hand secondary intake flap and controlling the movements thereof, and
    a fourth actuator coupled to the secondary exhaust flap and controlling the movements thereof.

7. The cooling device as claimed in claim 1,
    wherein the at least one cooling circuit comprises main cooling circuits including a single main air inlet equipped with a main intake flap and a single main air outlet equipped with a main exhaust flap, wherein the at least one cooling circuit further comprises two, right-hand and left-hand, secondary cooling flaps each including a right-hand or left-hand secondary air inlet equipped with a right-hand or left-hand secondary intake flap and a right-hand or left-hand secondary air outlet, wherein the cooling device further comprises:

a single secondary exhaust flap configured to block simultaneously in the closed position the right-hand and left-hand secondary air outlets, and wherein the at least one actuator comprises:

a first actuator coupled to the pair of main intake and exhaust flaps and controlling the movements thereof, and a second actuator coupled to the right-hand and left-hand secondary intake flaps as to the secondary exhaust flap and controlling the movements thereof.

8. The cooling device as claimed in claim 1, further comprising:

a controller configured to control the at least one actuator and to monitor movements of the various intake and exhaust flaps.

9. An aircraft propulsion system comprising at least one cooling device as claimed in claim 1.

10. An aircraft comprising propulsion systems, each including at least one cooling device as claimed in claim 1.

11. A device for cooling an aircraft propulsion system, comprising:

a plurality of cooling circuits, each having at least one air inlet and at least one air outlet, at least one intake flap mobile between an open position in which the intake flap uncovers at least partially the air inlet and a closed position in which the intake flap blocks the air inlet, and at least one exhaust flap mobile between an open position in which the exhaust flap uncovers at least partially the air outlet and a closed position in which the exhaust flap blocks the air outlet, wherein at least one exhaust flap is configured to block simultaneously, in the closed position, two air outlets of two cooling circuits, wherein the cooling device comprises at least one actuator coupled by at least one kinematic system to the pair of intake flaps and exhaust flaps such that said intake and exhaust flaps are driven in synchronized movements and simultaneously occupy the closed position or the open position.

* * * * *